(12) United States Patent
Urakami et al.

(10) Patent No.: US 6,297,332 B1
(45) Date of Patent: *Oct. 2, 2001

(54) EPOXY-RESIN COMPOSITION AND USE THEREOF

(75) Inventors: Tatsuhiro Urakami; Kenichi Sugimoto; Keisuke Takuma; Tadahito Nobori; Usaji Takaki, all of Kanagawa (JP)

(73) Assignee: Mitsui Chemicals, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/295,592

(22) Filed: Apr. 22, 1999

(30) Foreign Application Priority Data

| Apr. 28, 1998 | (JP) | 10-119569 |
| Apr. 28, 1998 | (JP) | 10-119572 |
| Apr. 28, 1998 | (JP) | 10-119573 |
| Apr. 28, 1998 | (JP) | 10-119574 |
| Apr. 28, 1998 | (JP) | 10-119575 |
| Apr. 28, 1998 | (JP) | 10-119576 |

(51) Int. Cl.⁷ .......... C08F 283/00; C08L 63/00; H01L 29/12
(52) U.S. Cl. .......... 525/481; 525/523; 523/466; 523/468; 428/620
(58) Field of Search .......... 525/481, 523; 523/466, 468; 428/620

(56) References Cited

U.S. PATENT DOCUMENTS

| 3,759,872 | 9/1973 | Lorenz et al. | |
| 5,739,187 | * 4/1998 | Asano et al. | 525/481 |
| 5,789,498 | * 8/1998 | Ohnishi et al. | 525/481 |
| 5,872,196 | * 2/1999 | Murata et al. | 525/481 |
| 5,910,548 | * 6/1999 | Murata et al. | 525/481 |
| 5,916,683 | * 6/1999 | Veda et al. | 525/481 |
| 5,985,455 | * 11/1999 | Tokunaga et al. | 525/481 |
| 6,005,030 | * 12/1999 | Togawa et al. | 525/481 |

FOREIGN PATENT DOCUMENTS

| 0950649 | 10/1999 | (EP) . |
| 47-15111 | 5/1972 | (JP) . |
| 59-105018 | 6/1984 | (JP) . |
| 62-28165 | 6/1987 | (JP) . |
| 7-206984 | 8/1995 | (JP) . |
| 09-235451 | 9/1997 | (JP) . |

OTHER PUBLICATIONS

G.N. Koidan, A.P. Marchenko, and A.M. Pinchuk, "Methylation of the Phosphoryl Group by Methyl Iodide", *Journal of General Chemistry of The USSR*, 55, p. 1453 (1985).

* cited by examiner

*Primary Examiner*—Philip Tucker
(74) *Attorney, Agent, or Firm*—Burns, Doane, Swecker, & Mathis, L.L.P.

(57) ABSTRACT

An epoxy-resin composition comprising (A) an at least bifunctional epoxy compound and/or an at least bifunctional epoxy resin, (B) a curing agent, and (C) an accelerating agent, the accelerating agent essentially containing a phosphine oxide represented by general formula (1);

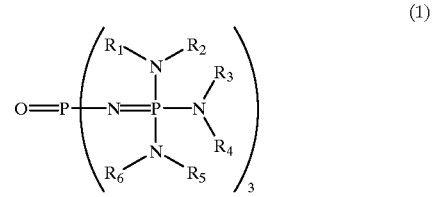

where $R_1$ to $R_6$ all of which may be the same or not are hydrogen, straight, branched or cyclic alkyl having 1 to 10 carbons or aryl or aralkyl having 6 to 10 carbons.

17 Claims, 1 Drawing Sheet

Fig.1

EPOXY-RESIN COMPOSITION AND USE THEREOF

BACKGROUND OF THE INVENTION

1. Field of the Invention

This invention relates to an epoxy-resin composition and in particular relates to an epoxy-resin composition with adequate performance for sealing a semiconductor integrated circuit, and further to a cured product thereof and a semiconductor device where a semiconductor integrated circuit is sealed with the epoxy resin.

2. Description of the Related Art

An integrated circuit (IC) or a large scale integrated circuit (LSI) is practically protected by a sealer for eliminating malfunction due to dirt or dust in the outer atmosphere, heat, moisture or light. Such a sealer has been recently shifted from a metal or ceramic to a resin, and at present sealing is mainly made with an epoxy resin. Specifically, in the light of balance between cost and physical properties, there have been often used an epoxy-resin composition comprising a phenol resin as a curing agent; in particular a phenol-novolac type of epoxy-resin composition comprising a phenol resin as a curing agent.

The resin composition has an excellent heat resistance required especially for a sealer, but is less resistant to moisture. To solve the problem, JP-B 47-15111 has disclosed a phenol aralkyl resin where a methylene bridge in a novolac resin is replaced with a xylylene bridge to reduce a hydroxy density for improving moisture resistance and flexibility. JP-B 62-28165 and JP-A 59-105018 have suggested the use of it as an epoxy resin and an IC sealer, respectively.

The epoxy-resin composition has excellent heat resistance, moisture resistance and flexibility, but has the following drawbacks;

(1) it absorbs moisture in the outside air and thus may be cracked due to explosive gasification of the moisture when exposed to a high temperature under soldering conditions;

(2) there may partially occur homopolymerization of an epoxy monomer as a side reaction during a curing process which causes excessive hydroxy groups in a resulting phenol resin, leading to deterioration of moisture resistance and electric characteristics, as well as deterioration in mechanical characteristics due to the presence of epoxy-homopolymerization and excessive phenol-resin parts other than a desired epoxy-phenol resin network; and (3) contamination with free ions, in particular halogen ions may cause corrosion of metal parts in semiconductor or electric leakage.

Ionic impurities as described in (3) may be controlled by refining the epoxy resin; (1) and (2) may be controlled by reforming the resin and minimizing side reactions, respectively, to allow the desired physical properties for an epoxy-resin composition to be adequately attained.

In general, reaction of an epoxy resin with a phenol resin is an addition reaction using a catalyst including phosphines such as trialkylphosphines and triarylphosphines; phosphonium borates such as tetraalkylphosphonium borates and tetraarylphosphonium borates; imidazoles; tertiary amines; and diazabicyclo compounds. In particular, imidazoles and phosphines are often used for sealing a semiconductor. It is, however, known that an imidazole compound is highly reactive, but tends to cause the above-mentioned epoxy-homopolymerization, leading to the problem (2).

On the other hand, a phosphine does not cause such a problem, but may take a very long time for complete curing and may gradually cure the compound at room temperature or even in a refrigerator, which makes it difficult to be employed as a curing catalyst.

Recently, a naphthol-resin type of curing agent has been suggested, which exhibits high heat resistance and low hygroscopicity. JP-A 7-206984 has, however, pointed out that triphenylphosphine is easily oxidized, via naphthol as a curing agent, into triphenylphosphine oxide, losing its catalytic activity.

A sealer is required to have low hygroscopicity, high heat resistance and good mechanical properties, as well as generally improved electric properties and crack resistance. Recent significant integration in an electric or semiconductor device has increasingly demanded a sealer which can maintain its electric properties without cracks under more severe conditions.

A variety of epoxy and phenol resins have been developed to solve the problem, while improvement on an accelerating agent has been little investigated.

SUMMARY OF THE INVENTION

An object of this invention is to provide an accelerating agent for an epoxy-resin composition for sealing a semiconductor which has good crack resistance, causes no side reactions and exhibits good curing properties as well as is quite conveniently applied in practice, and to provide a cured product and a semiconductor device which are obtained by employing the agent.

We have intensely attempted to solve the above problems and finally have found that a certain accelerating agent may be used to solve the problems.

Specifically, this invention provides (a) An epoxy-resin composition comprising (A) an at least bifunctional epoxy compound and/or an at least bifunctional epoxy resin, (B) a curing agent, and (C) an accelerating agent, the accelerating agent essentially containing a phosphine oxide represented by general formula (1);

where $R_1$ to $R_6$ all of which may be the same or not are hydrogen, straight, branched or cyclic alkyl having 1 to 10 carbons or aryl or aralkyl having 6 to 10 carbons;

(b) the epoxy-resin composition as described in (a) where (B) the curing agent is an at least bifunctional phenol compound and/or phenol resin;

(c) the epoxy-resin composition as described in (b) where the at least bifunctional epoxy compound and/or epoxy resin is selected from an epoxy resin derived from a dihydroxynaphthalene represented by general formula (2), an epoxy resin derived from a biphenol represented by general formula (3), an epoxy resin derived from a novolac type of resin represented by general formula (4), an epoxy resin derived from a phenol aralkyl resin represented by general formula (5) and an epoxy resin derived from a phenol-dicyclopentadiene resin represented by general formula (6);

(2)

where the ring is substituted with 2,3-epoxypropyl groups at 1, 5-, 1,6-, 1,7-, 2,6- or 2,7-positions where $R_7$ all of which may be the same or not is hydrogen or methyl; $R_8$ is hydrogen, methyl or ethyl; $R_9$ is halogen, hydroxyl, straight, branched or cyclic alkyl having 1 to 10 carbons, alkoxy having 1 to 10 carbons or phenyl; m is an integer of 0 to 3; and n is an integer of 0 to 100, provided that an average of n is 0 to 15;

(d) the epoxy-resin composition as described in (b) or (c) where the at least bifunctional phenol compound and/or phenol resin is selected froma novolac type of resin represented by general formula (7), a phenol aralkyl resin represented by general formula (8), a phenol-dicyclopentadiene resin represented by general formula (9) or a naphthol aralkyl resin represented by general formula (10);

(3)

(4)

(5)

(6)

(7)

(8)

(9)

(10)

where $R_8$ is hydrogen, methyl or ethyl; $R_9$ is halogen, hydroxy, straight, branched or cyclic alkyl having 1 to 10 carbons, alkoxy having 1 to 10 carbons or phenyl; m is an integer of 0 to 3; n indicating a repeating unit number is an integer of 0 to 100 whose average is 0 to 15; and p indicating a repeating unit number is an integer of 0 to 100 whose average is 0 to 50;

(e) the epoxy-resin composition as described in any of (b) to (d) comprising (C) an organic and/or inorganic filler in the range of 100 to 1900 parts by weight per 100 parts by weight of (A)+(B);

(f) An epoxy-resin cured product prepared by heat curing of the epoxy-resin composition as described in (e).

(g) A semiconductor device manufactured by sealing a semiconductor integrated circuit using the epoxy-resin composition as described in (e).

(h) An epoxy-resin composition comprising (A) an at least bifunctional epoxy compound and/or epoxy resin, (B) a curing agent and (C) an accelerating agent, whose time for 90% of the maximum torque during curing at 175° C. measured with a curelastometer [t'c(90)] is 1 to 5 minutes and in which a ratio of t'c(90) to a time for 10% of the maximum torque [t'c(10)] is 1.5 to 7.5.

(i) An epoxy-resin composition as described in (h) comprising (C) an organic and/or inorganic filler in the range of 100 to 1900 parts by weight per 100 parts by weight of (A)+(B).

(j) An epoxy-resin cured product prepared by heat curing of the epoxy-resin composition as described in (h) or (i).

(k) A semiconductor device manufactured by sealing a semiconductor integrated circuit using the epoxy-resin composition as described in (i).

An epoxy-resin composition according to this invention can be used in those applications in which a conventional epoxy-resin composition has been used, and may be used as a sealer for a semiconductor to give a package better in crack resistance than that from a conventional epoxy resin-phenol resin cured product.

DETAILED DESCRIPTION OF THE PREFERRED EMBODIMENTS

This invention typically provides an epoxy-resin composition comprising (A) an at least bifunctional epoxy compound and/or an at least bifunctional epoxy resin, (B) a curing agent, and (C) an accelerating agent, the accelerating agent essentially containing a phosphine oxide represented by general formula (1).

The epoxy-resin composition of this invention essentially comprises the phosphine oxide represented by general formula (1) to solve the above problems in (1) and (2) and provides excellent mechanical properties, especially flexibility and heat resistance, and excellent crack resistance and electric properties in comparison with a composition comprising a conventional imidazole or phosphine accelerating agent. Furthermore, using the composition, a time taken for complete curing may be significantly reduced, which is a practically prominent advantage.

An organic and/or an inorganic filler may be added to the resin composition to give it very preferable properties as a sealer for a semiconductor integrated circuit, which has been observed by the inventors for the first time.

In the phosphine oxide represented by general formula (1), $R_1$ to $R_6$ all of which may be the same or not are hydrogen, straight, branched or cyclic alkyl having 1 to 10 carbons or aryl or aralkyl having 6 to 10 carbons.

Specifically, $R_1$ to $R_6$ may be selected from hydrogen; alkyls such as methyl, ethyl, n-propyl, isopropyl, n-butyl, sec-butyl, tert-butyl, 1-pentyl, 2-pentyl, 3-pentyl, 2-methyl-1-butyl, isopentyl, tert-pentyl, 3-methyl-2-butyl, neopentyl, n-hexyl, 4-methyl-2-pentyl, cyclopentyl, cycfohexyl, 1-heptyl, 3-heptyl, 1-octyl, 2-octyl, 2-ethyl-1-hexyl, nonyl and decyl; aryls and aralkyls such as phenyl, toluyl, benzyl, 1-phenylethyl and 2-phenylethyl; preferably alkyls such as methyl, ethyl, n-propyl, isopropyl, n-butyl and cyclohexyl; more preferably methyl and ethyl.

The phosphine oxide represented by general formula (1) can be prepared by reacting phosphorus oxychloride with three molar amount of imino-tris(unsubstituted or mono- or di-substituted amino) phosphorane as described in G.N.Koian, et al., Journal of General Chemistry of The USSR, 55, 1453 (1985).

The phosphine oxide represented by general formula (1) is hygroscopic and therefore may have crystal water or contain a small amount of water. It may, however, not be degenerated, for example, hydrolysis or adversely affect the objective of this invention, due to moisture absorption. For this invention, it is practically preferable that the compound is dried.

In an epoxy-resin composition of this invention, (A) an at least bifunctional epoxy compound and/or epoxy resin may include any compound having two or more epoxy groups in one molecule. Specifically, it may have epoxy groups formed by oxidation of an olefin, glycidyl etherification of hydroxyl groups, glycidyl amination of a primary or secondary amine or glycidyl esterification of a carboxylic acid.

Compounds which may be subject to such epoxidation include dihydroxybenzenes such as catechol, resorcine and hydroquinone;

bisphenols such as 2,6-dihydroxynaphthalene, 2,2-bis(4-hydroxyphenyl)propane (bisphenol A), 2-(3-hydroxyphenyl)-2-(4'-hydroxyphenyl)propane, bis(4-hydroxyphenyl)methane (bisphenol F), bis(4-hydroxyphenyl)sulfone (bisphenol S), bis(4-hydroxyphenyl)sulfide, bis(4-hydroxyphenyl)methylcyclohexane, bis(4-hydroxyphenyl)methylbenzene, 4,4'-dihydroxybiphenyl, 4,4'-dihydroxy-2,2',6,6'-tetramethylbiphenyl, 4,4-dihydroxydiphenyl ether, 6,6'-dihydroxy-3,3,3', 3'-tetramethyl-1,1-spirobiindane and 1,3,3-trimethyl-1-(4-hydroxyphenyl)-1-indan-6-ol;

oligophenols such as tetraphenylolethane and naphthol-cresol resol condensate;

phenol resins such as a phenol novolac represented by general formula (7), a residual moiety after removing the bisphenol from the novolac (at least triphenol; referred to as "VR"), a phenol aralkyl represented by general formula (8), a naphthol aralkyl represented by general formula (10), and a phenol-dicyclopentadiene copolymer resin (DPR resin) represented by general formula (9);

aliphatic and aromatic amines such as ethylenediamine, propylenediamine, hexamethylenediamine, aniline, 4,4'-diaminophenylmethane (MDA), 4,4'-diaminodiphenyl ether, 4,4'-diaminodiphenylsulfone, 2,2-bis(4,4'-diaminophenyl)propane, m-xylylenediamine, p-xylylenediamine, 1,2-diaminocyclohexane and an aniline aralkyl resin represented by general formula (11) (trade name: Anilix, Mitsui Chemical Inc.);

(11)

where $R_{10}$ is hydrogen or straight, branched or cyclic alkyl having 1 to 9 carbons; and n' indicating a repeating unit number is 0 to 50 whose average is 0 to 15, provided when an average of n' as a repeating unit number is zero, the formula represents a bisaniline compound;

aminophenols such as m-aminophenol, p-aminophenol, 2-(4-aminophenyl)-2-(4'-hydroxyphenyl)propane and 4-aminophenyl-4-hydroxyphenyl)methane;

carboxylic acids such as phthalic acid, isophthalic acid, terephthalic acid, tetrahydrophthalic acid, hexahydrophthalic acid, dimer acid and 1,3-dicarboxycyclohexane; and hydroxycarboxylic acids such as salicylic acid and 4-hydroxybenzoic acid.

Such compounds having an active hydrogen may be glycidylated by a known process. It may be common to react a compound with an epichlorohydrin in the presence of a hydrogen halide acceptor. It is well known that a glycidyl ester may be prepared preferably by reacting methyl carboxylate with glycidol using a metal catalyst, in particular a thallium compound such as $TlNO_3$ and $Tl(OCOCF_3)_3$.

Preferable sealers for a semiconductor integrated circuit to which this invention mainly directs may include glycidyl ethers derived from a phenol compound and/or phenol resin; specifically an epoxy resin derived from a dihydroxynaphthalene represented by general formula (2), an epoxy resin derived from a biphenol represented by general formula (3), an epoxy resin derived from a phenol novolac resin represented by general formula (4), an epoxy resin derived from a phenol aralkyl resin represented by general formula (5) and an epoxy resin derived from a phenol-dicyclopentadiene resin represented by general formula (6).

In an epoxy-resin composition of this invention, (B)a curing agent has two or more active hydrogens which react with an epoxy group. Such a curing agent may include the above compounds for an epoxy resin; preferably phenols and phenol resins; more preferably a phenol novolac resin represented by general formula (7), a phenol aralkyl resin represented by general formula (8), a phenol-dicyclopentadiene resin represented by general formula (9) and a naphthol aralkyl resin represented by general formula (10).

These phenol resins may be prepared as follows.

A novolac resin may be prepared by a common process, specifically by reacting a phenol compound with formaldehyde (usually, formalin) in the presence of an acid catalyst. Phenols which may be used include phenol, o-cresol, m-cresol, p-cresol, o-ethylphenol, m-ethylphenol and p-ethylphenol.

A phenol aralkyl resin may be prepared by reacting a phenol compound with an aralkyl halide, aralkyl alcohol or its derivative. Phenols whichmay be used include phenol, o-cresol, m-cresol, p-cresol, o-ethylphenol, m-ethylphenol, p-ethylphenol, p-n-propylphenol, p-isopropylphenol, p-n-butylphenol, p-sec-butylphenol, p-tert-butylphenol, octylphenol, nonylphenol, p-cyclohexylphenol, 2,4-xylenol, 2,6-xylenol, 4,6-xylenol, 3,5-xylenol, 2,4,6-trimethylphenol, guaiacol (2-methoxyphenol), 3-methoxyphenol, 4-methoxyphenol, o-phenylphenol, m-phenylphenol, p-phenylphenol, o-chlorophenol, m-chlorophenol, p-chlorophenol, o-fluorophenol, m-fluorophenol, p-fluorophenol, o-iodophenol, m-iodophenol, p-iodophenol, o-bromophenol, m-bromophenol, p-bromophenol, resorcine (m-dihydroxybenzene), hydroquinone (p-dihydroxybenzene) and catechol (o-dihydroxybenzene).

These phenols may be used alone or in combination of two or more.

Aralkyl compounds which may be subject to reaction with a phenol compound include α,α'-dihalogenoxylenes such as α,α'-dichloro-p-xylene, α,α'-dichloro-m-xylene, α,α',-dichloro-o-xylene, α,α'-dibromo-p-xylene, α,α'-dibromo-m-xylene and α,α'-dibromo-o-xylene;

xylyleneglycols such as α,α'-dihydroxy-p-xylene, α,α'-dihydroxy-m-xylene and α,α'-dihydroxy-o-xylene; and α,α'-dialkoxyxylenes such as α,α'-dimethoxy-p-xylene, α,α'-dimethoxy-m-xylene, α,α'-dimethoxy-o-xylene, α,α'-diethoxy-p-xylene, α,α'-diethoxy-m-xylene, α,α'-diethoxy-o-xylene, α,α'-dipropoxy-p-xylene, α,α'-dipropoxy-m-xylene, α,α'-dipropoxy-o-xylene, α,α'-diisopropoxy-p-xylene, α,α'-diisopropoxy-m-xylene, α,α'-diisopropoxy-o-xylene, α,α'-di-tert-butoxy-p-xylene, α,α'-di-tert-butoxy-m-xylene, α,α'-di-tert-butoxy-o-xylene, α,α'-di-n-butoxy-p-xylene, α,α'-di-n-butoxy-m-xylene and α,α'-di-n-butoxy-o-xylene.

A desired phenol aralkyl resin may be prepared by reacting any of the above phenols with one or more of the aralkyl halides, aralkyl alcohols and their derivatives.

A phenol-dicyclopentadiene resin may be prepared by reacting a phenol compound with dicyclopentadiene. Phenols which may be used are the same as described for a phenol aralkyl resin.

A naphthol aralkyl resin may be prepared by reacting α-or β-naphthol with any of the alkyl halides, aralkyl alcohols and their derivatives.

A resin composition comprising an epoxy resin and a curing agent which have an amine and/or a carboxylic acid moiety in their backbone is generally hygroscopic and thus is used especially when a particular physical property including heat resistance is required.

In an epoxy-resin composition of this invention, a mix proportion of (A) an epoxy resin/(B) a curing agent may be adjusted such that there exist 0.5 to 1.5 equivalents, preferably 0.7 to 1.3 equivalents of active hydrogens to epoxy groups. Their equivalent ratio may be preferably adjusted to provide optimal physical properties of a resulting cured product.

In an epoxy-resin composition of this invention, an epoxy resin or curing agent may be used alone or in combination of two or more.

In an epoxy-resin composition of this invention, phosphine oxide compound, as an essential accelerating agent component, may be contained preferably in a proportion of 0.001 to 25 wt % (0.001 to 25 g/100 g), more preferably 0.01 to 15 wt %, most preferably 0.1 to 5 wt % to the entire epoxy-resin composition (the total of the resin components, i.e., the epoxy resin and the curing agent). It corresponds to a molar equivalent of preferably $1.5 \times 10^{-6}$ to $4.5 \times 10^{-2}$ mol/100 g, more preferably $1.5 \times 10^{-5}$ to $2.5 \times 10^{-2}$ mol/100 g, most preferably $1.5 \times 10^{-4}$ to $1.0 \times 10^{-2}$ mol/100 g.

In an epoxy-resin composition of this invention, the phosphine oxide derivative may be used with a common well-known accelerating agent including imidazoles such as 2-methylimidazole, phosphines such as triphenylphosphine, tertiary amines such as triethylamine and diazabicyclo compounds such as 1,8-diazabicyclo(5,4,0)undec-7-ene in an amount of 0.5 to 500 wt % (5-fold weight) to the phosphine oxide, as long as it does not adversely affect the effects of this invention.

In an epoxy-resin composition of this invention, an organic and/or an inorganic filler or other additive may be, if necessary, added. In particular, when the composition is used as a sealer for a semiconductor circuit, it may desirably contain an organic and/or an inorganic filler for improving its mechanical properties and overall cost reduction, and a coloring agent such as carbon black for preventing malfunction due to light. In addition, it may preferably contain a mold release, a coupling agent and a flame retardant.

The amount of the organic and/or inorganic filler may be 100 to 1900 parts by weight, preferably at least 250 parts by weight, more preferably at least 550 parts per 100 parts by weight of (A)+(B).

Organic and/or inorganic fillers which may be used include powders such as silica, alumina, silicon nitride, silicon carbide, talc, calcium silicate, calcium carbonate, mica, clay and titanium white; and fibers such as glass fiber, carbon fiber and aramid fiber. Among these, suitable fillers for a sealer are crystal silica and/or fused silica, which are preferably sphere or a mixture of sphere and amorphous in the light of their fluidity during molding of the resin composition.

Furthermore, it is preferable to add a variety of additives in the light of mechanical strength and heat resistance. For example, it may be preferable to use a coupling agent for improving adhesiveness of a resin to an inorganic filler; such a coupling agent may be a silane, titanate, aluminate or zircoaluminate coupling agent, preferably a silane coupling agent; particularly a silane coupling agent having a functional group capable of reacting an epoxy group.

Specific coupling agents which may be used include vinyltrimethoxysilane, vinyltriethoxysilane, N-(2-aminomethyl)-3-aminopropyl-methyl-dimethoxysilane, N-(2-aminoethyl)-3-aminopropyl-trimethoxysilane, 3-aminopropyl-triethoxysilane, 3-anilinopropyl-triethoxysilane, 3-glycidoxypropyl-trimethoxysilane, 3-glycidoxypropyl-methyl-dimethoxysilane, 2-(3,4-epoxycyclohexyl)ethyl-trimethoxysilane, 3-methacryloxypropyl-trimethoxysilane and 3-mercaptopropyl-trimethoxysilane.

These may be used alone or in combination of two or more. Such a coupling agent is preferably pre-immobilized on the surface of the inorganic filler via adsorption or reaction.

Figure 1:
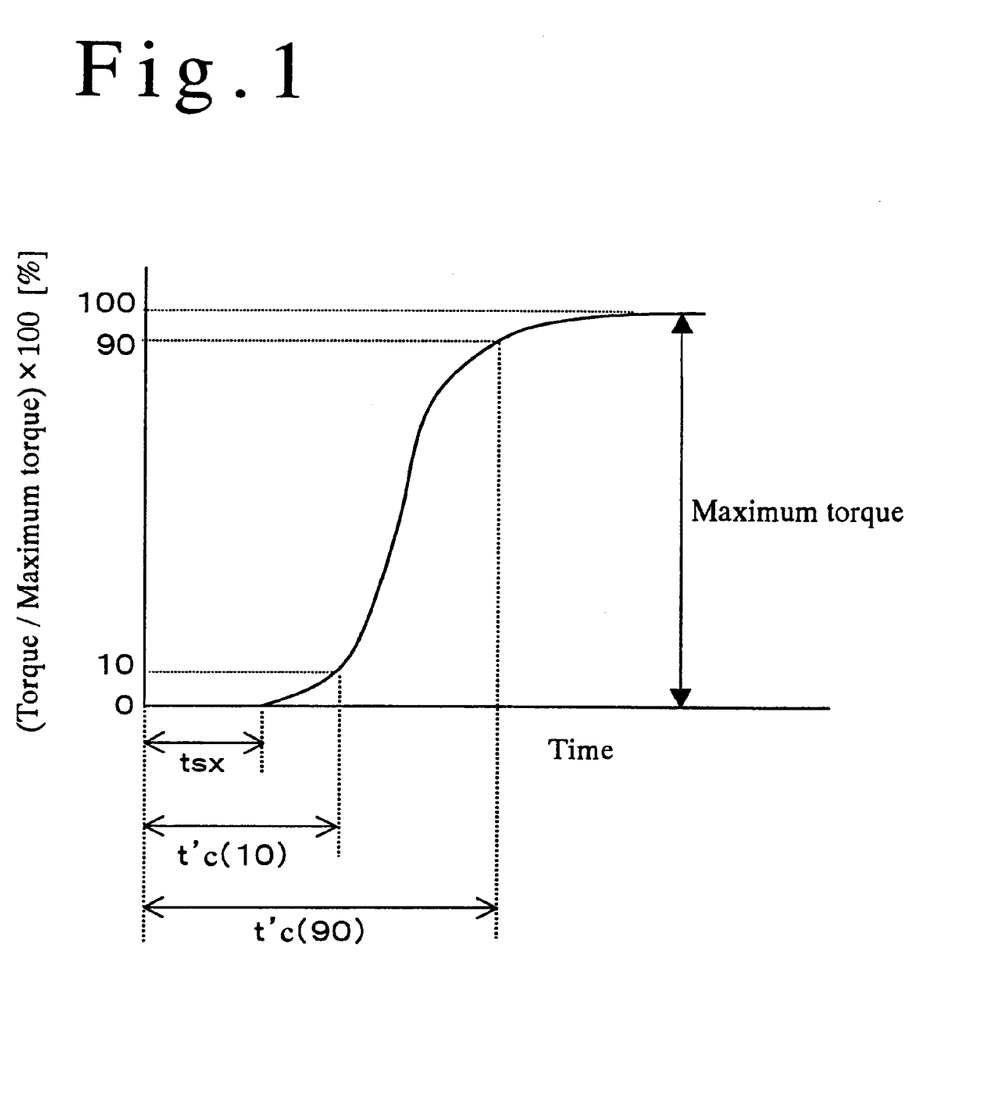
FIG. 1 shows curing behavior of an epoxy-resin composition with a curelastometer.

This invention also provides an epoxy-resin composition comprising (A) an at least bifunctional epoxy-compound or epoxy resin, (B) acuring agent and (C) an accelerating agent, in which t'c(90) is 1 to 5 min and t'c(90)/t'c(10) is 1.5 to 7.5 wherein t'c(10) and t'c(90) are times for 10% and 90% of the maximum torque determined by measuring the curing behavior of the epoxy-resin composition with a curelastometer at 175° C., respectively. Preferably, t'c(90) is 1 to 3 min and t'c(90)/t'c(10) is 1.5 to 6.5. FIG. 1 shows the curing behavior of the above epoxy-resin composition measured with a curelastometer. In brief, a torque begins to gradually increase after a certaintimefrom the start, which isdesignated tsx. Times for 10% and 90% of the maximum torque from the start are designated t'c(10) and t'c(90), respectively.

The epoxy-resin composition of this invention is characterized in less t'c(90) and t'c(90)/t'c(10) than those for a composition according to the prior art. Reduced t'c(90) may lead to a shorter time for complete curing than that from a conventional catalyst, which may contribute to increase of productivity. A reduced value of t'c(90)/t'c(10) and a relatively longer initial curing time may lead to improvement in workability; for example, the composition of this invention may be applied to a sealer to improve workability such as an extended kneading time and a reduced curing time.

An epoxy-resin exhibiting such curing behavior may be prepared by using a phosphine oxide represented by general formula (1) as (C) an accelerating agent. It is apparent from the fact that when a tetramethylbiphenyl type of epoxy resin (trade name: YX-4000H, epoxy equivalent: 184 g/eq; Yuka Shell Epoxy) andaphenol aralkyl resin (trade name: XLC-4L, ahydroxyl equivalent of 169 g/eq; Mitsui Chemical Inc.) are used as an epoxy resin and a curing agent, respectively, in an equivalent ratio of 1/1 , an epoxy-resin composition comprising a phosphine oxide of this invention (Example 23 described later) provided a 2.13-fold time for 10% of the maximum torque measured with a curelastometer while providing a 0.378-fold time for 90%, in comparison with an epoxy-resin composition comprising triphenylphosphine (Comparative Example 39 described later). There have been reported no accelerators having such ideal curing behavior.

An epoxy-resin cured product of this invention is a product obtained by thermally curing an epoxy-resin composition of this invention.

The epoxy-resin cured product has higher heat resistance than a product obtained using a conventional accelerating agent.

A semiconductor device of this invention is a device manufactured by sealing a semiconductor integrated circuit using an epoxy-resin composition of this invention. The semiconductor device may be commonly manufactured by low-pressure transfer molding, but other processes may be used; for example, injection molding, compression molding and cast molding. Furthermore, a special process using a solvent may be employed.

The semiconductor device of this invention has a characteristic that there may occur less cracks than one from a conventional accelerating agent.

EXAMPLES

This invention will be detailed with reference to, but not limited to, examples.

Example 1

One gram equivalent of bisphenol-A type of diglycidyl ether (trade name: Epicoat 828, Yuka Shell Epoxy, epoxy equivalent: 184 g/eq) and a phenol novolac resin (trade name: BRG#558, Showa Kobunshi, hydroxy equivalent: 104 g/eq) as an epoxy resin and a curing agent, respectively, were melted and kneaded at 80° C. to give a homogeneous resin mixture.

To the resin composition was added 0.005 mol of a phosphine oxide represented by general formula (1) where all of $R_1$ to $R_6$ are methyl (hereinafter, referred to as "PZO"), and the mixture was kneaded for 1 min at 50° C.

To 200 g of the resin component were blended a filler and other additives in the following proportions, and the mixture was heated and kneaded with a roll to give a molding material for a sealer.

Inorganic filler: 720 g
  [a mixture of 50 parts by weight of sphere fused silica (Halimic S-CO, Micron) and 50 parts by weight of amorphous fused silica (Fusedrex RD-8, Tatsumori)]

Silane coupling agent: 62 g
  (SZ-6083, Toray Dow Corning Silicone)

Carnauba wax 45 g

Carbon black: 3 g

Antimony oxide: 10 g

A portion of the molding material thus prepared was cured under the conditions of 150° C.→185° C./5 min, 185° C./5 min and 150 kg/cm², and was subjected to after-curing under the condition of 185° C./8 hr in an atmosphere of nitrogen to be adequately cured. Various physical properties were determined for the cured product. The results are shown in Table 1. The same molding material was used to prepare a semiconductor device for testing, by low-pressure transfer molding. It was then subject to a crack initiation test using a solder bath. The results are also shown in Table 1.

A gel time for a resin composition before roll kneading wasdeterminedat150° C. Acurelastometer was used to determine curing behavior at 175° C. for the resin composition. Times till torque start, 10% curing and 90% curing were determined and shown in Table 1 as tsx, t'c(10) and t'c(90), respectively.

The various physical properties were determined as follows.

Tg (glass-transition temperature): determined by a TMA needle inserting technique (Shimazu; TMA-DRW DT-30);

Flexural strength, coefficient of elasticity: determined according to JIS K-6911;

Boiling water absorption: determined by measuring a weight increase after heating 2 hrs in boiling water at 100° C.;

V.P.S.test: immediately after being placed in a thermo-hygrostat at 85° C. and 85% for 168 hours, test semiconductor devices were soaked in Frolinate liquid (Sumitomo 3M; FC-70) at 240° C. Semiconductors whose package resin had a crack were counted. The results are given as a fraction where a numerator is the number of semiconductors having a crack and a denominator is the number of tested devices;

Curing behavior: determined with CURELASTOMETER type V (Nichigo Shoji); mold: P-200 (for a resin), temperature: 175° C., frequency: 100 cycles/min, amplitude angle: ±1°; sample amount: 4.5 g.

Gel time: determined for a resin composition before roll kneading with a curelastometer at 150° C.

Example 2

A molding material for a sealer was prepared as described in Example 1, except that a tetraphenylolethane type of epoxy resin represented by formula (12) (trade name: E1031S, Yuka Shell Epoxy, epoxy equivalent: 189 g/eq) was used as an epoxy resin.

The material was processed as described in Example 1 for determining physical properties of a cured product and for a crack test for a test semiconductor device. The results are shown in Table 1.

(12)

Example 3

A molding material for a sealer was prepared as described in Example 1, except that a naphthol-cresol resol condensate type of epoxy resin represented by formula (13) (trade name: EOCN7000, Nihon Kayaku, epoxy equivalent: 204 g/eq) was used as an epoxy resin.

The material was processed as described in Example 1 for determining physical properties of a cured product and for a crack test for a test semiconductor device. The results are shown in Table 1.

(13)

Example 4

A molding material for a sealer was prepared as described in Example 1, except that a spirobiindane diphenol type of epoxy resin represented by formula (14) (trade name: SPIDG, Mitsui Chemical Inc., epoxy equivalent: 233 g/eq) was used as an epoxy resin.

The material was processed as described in Example 1 for determining physical properties of a cured product and for a crack test for a test semiconductor device. The results are shown in Table 1.

(14)

Example 5

A molding material for a sealer was prepared as described in Example 1, except that a naphthol-p-cresol resol condensate represented by formula (15) (trade name: NHN, Nihon Kayaku, hydroxy equivalent: 140 g/eq) was used as a curing agent.

The material was processed as described in Example 1 for determining physical properties of a cured product and for a crack test for a test semiconductor device. The results are shown in Table 1.

(15)

A gel time for the resin composition before roll kneading was unchanged after leaving it in the atmosphere at room temperature for 10 days.

Comparative Examples 1 to 5

An attempt was made to prepare molding materials as described in Examples 1 to 4 using triphenylphosphine (hereinafter, referred to as "TPP") as a curing agent, but the compositions exhibited quite poor curing properties. Therefore, molding materials for a sealer were prepared as described in Examples 1 to 4, except for increasing the amount of thecatalyst to 0.015 mol.

The materials were processed as described in Example 1 for determining physical properties of a cured product and for a crack test for a test semiconductor device. A gel time for each composition was determined in the same way. The results are shown in Table 1.

Furthermore, in Comparative Example 5, a gel time after leaving for 10 days was determined as described in Example 5, to give a gel time of more than 15 min, which apparently indicates deterioration in curing catalyst activity.

TABLE 1

| Example | 1 | 2 | 3 | 4 | 5 |
|---|---|---|---|---|---|
| Proportion (wt parts) | | | | | |
| Main ingredients | | | | | |
| Epicoat 828 | 184 | — | — | — | 184 |
| E1031S | — | 189 | — | — | — |
| EOCN 7000 | — | — | 204 | — | — |
| SPIDG | — | — | — | 233 | — |
| Curing agents | | | | | |
| BRG #558 | 104 | ← | ← | ← | — |
| NHN | — | — | — | — | 140 |

TABLE 1-continued

| | | | | | |
|---|---|---|---|---|---|
| Accelerating agents | | | | | |
| PZO (mol) | 0.005 | ← | ← | ← | ← |
| TPP (mol) | — | — | — | — | — |
| Physical properties | | | | | |
| Glass-transition temperature (° C.) | 145 | 138 | 147 | 144 | 140 |
| Flexural strength (Kgf/mm$^2$) | 12.2 | 12.4 | 12.4 | 12.6 | 13.0 |
| Bend elastic const. (Kgf/mm$^2$) | 1650 | 1640 | 1620 | 1610 | 1640 |
| Boiling water absorption (%) | 0.13 | 0.14 | 0.13 | 0.12 | 0.13 |
| VPS test (crack incidence/10) | 5'23" | 5'28" | 5'42" | 5'41" | 5'19" |
| Gel time (min, sec) | | | | | |
| Curing behavior | | | | | |
| Torque start tsc (min, sec) | 1'44" | 1'41" | 1'29" | 1'45" | 1'48" |
| 10% curing t'c(90) (min, sec) | 1'58" | 1'49" | 1'41" | 1'51" | 1'59" |
| 90% curing t'c(90) (min, sec) | 4'29" | 4'21" | 4'09" | 4'45" | 4'45" |

| Comp. Example | 1 | 2 | 3 | 4 | 5 |
|---|---|---|---|---|---|
| Proportion (wt parts) | | | | | |
| Main ingredients | | | | | |
| Epicoat 828 | 184 | — | — | — | 184 |
| E1031S | — | 189 | — | — | — |
| EOCN 7000 | — | — | 204 | — | — |
| SPIDG | — | — | — | 233 | — |
| Curing agents | | | | | |
| BRG #558 | 104 | ← | ← | ← | — |
| NHN | — | — | — | — | 140 |
| Accelerating agents | | | | | |
| PZO (mol) | — | — | — | — | — |
| TPP (mol) | 0.005 | ← | ← | ← | ← |
| Physical properties | | | | | |
| Glass-transition temperature (° C.) | 138 | 130 | 139 | 135 | 130 |
| Flexural strength (Kgf/mm$^2$) | 12.3 | 12.4 | 12.1 | 12.5 | 12.8 |
| Bend elastic const. (Kgf/mm$^2$) | 1550 | 1540 | 1520 | 1510 | 1540 |
| Boiling water absorption (%) | 0.13 | 0.13 | 0.13 | 0.12 | 0.12 |
| VPS test (crack incidence/10) | 1 | 1 | 2 | 1 | 2 |
| Gel time (min, sec) | 4'33" | 4'19" | 4'39" | 4'50" | 4'29" |
| Curing behavior | | | | | |
| Torque start tsc (min, sec) | 0'29" | 0'28" | 0'29" | 0'26" | 0'38" |
| 10% curing t'c(10) (min, sec) | 0'41" | 0'39" | 0'41" | 0'51" | 0'59" |
| 90% curing t'c(90) (min, sec) | 6'29" | 6'21" | 6'09" | 6'45" | 9'45" |

Curing conditions: 150° C.→185° C./5 min, 185° C./5 min(150 kg/cm$^2$), 185° C./8 hr

Example 6

A molding material for a sealer was prepared as described in Example 1, except that an o-cresol novolac type of epoxy resin (trade name: EOCN102S, Nihon Kayaku, epoxy equivalent: 193 g/eq) was used as an epoxy resin; a phenol novolac resin (trade name: BRG#558, Showa Kobunshi, hydroxy equivalent: 104 g/eq) was used as a curing agent; and the amount of PZO was 0.0035 mol.

The material was processed as described in Example 1 for determining physical properties of a cured product and for a crack test for a test semiconductor device. The results are shown in Table 2.

Example 7

A molding material for a sealer was prepared as described in Example 6, except that a phenol aralkyl resin (trade name: Milex XLC-4L, Mitsui Chemical Inc., hydroxy equivalent: 169 g/eq) was used as a curing agent.

The material was processed as described in Example 6 for determining physical properties of a cured product and for a crack test for a test semiconductor device. The results are shown in Table 2.

Example 8

A molding material for a sealer was prepared as described in Example 6, except that a phenol-dicyclopentadiene resin (trade name: DPR#5000, Mitsui Chemical Inc., hydroxy equivalent: 180 g/eq) was used as a curing agent.

The material was processed as described in Example 6 for determining physical properties of a cured product and for a crack test for a test semiconductor device. The results are shown in Table 2.

Example 9

A molding material for a sealer was prepared as described in Example 6, except that a naphthol aralkyl resin (trade name: αNX-3.2, Mitsui Chemical Inc., hydroxy equivalent: 218 g/eq) was used as a curing agent.

The material was processed as described in Example 6 for determining physical properties of a cured product and for a crack test for a test semiconductor device. The results are shown in Table 2.

A gel time for the resin composition before roll kneading was 3'28" at 150° C., which was unchanged after leaving it in the atmosphere at room temperature for 10 days.

Comparative Examples 6 to 13

An attempt was made to prepare molding materials as described in Examples 6 to 9 using undecylimidazole (trade name: C11Z, Shikoku Fine Chemical) (Comparative Examples 6 to 9) or triphenylphosphine (TPP) (Comparative Examples 10 to 13) as a curing agent, but the compositions exhibited quite poor curing properties. Therefore, molding materials for a sealer were prepared, increasing the amount of the catalyst to 0.008 mol.

The materials were processed as described in Example 6 for determining physical properties of a cured product and for a crack test for a test semiconductor device. A gel time for each composition was determined in the same way. The results are shown in Table 2.

Furthermore, in Comparative Example 13 where a naphthol aralkyl resin and triphenylphosphine were used as a curing agent and a catalyst, respectively, a gel time after leaving for 10 days was determined as described in Example 9, to give a gel time of more than 15 min, which apparently indicates deterioration in curing catalyst activity.

TABLE 2

| Example | 6 | 7 | 8 | 9 |
|---|---|---|---|---|
| Proportion (wt parts) | | | | |
| Main ingredient | | | | |
| EOCN 102S | 193 | ← | ← | ← |
| Curing agents | | | | |
| BRG #558 | 104 | — | — | — |
| Milex XLC-4L | — | 169 | — | — |
| DPR #5000 | — | — | 180 | — |
| αNX-3.2 | — | — | — | 218 |
| Accelerating agents | | | | |

TABLE 2-continued

| | | | | |
|---|---|---|---|---|
| PZO (mol) | 0.0035 | ← | ← | ← |
| C11Z (mol) | — | — | — | — |
| TPP (mol) | — | — | — | — |
| Physical properties | | | | |
| Glass-transition temperature (° C.) | 177 | 146 | 144 | 156 |
| Flexural strength (Kgf/mm$^2$) | 14.2 | 13.8 | 13.3 | 13.5 |
| Bend elastic const. (Kgf/mm$^2$) | 1560 | 1660 | 1550 | 1585 |
| Boiling water absorption (%) | 0.17 | 0.14 | 0.10 | 0.12 |
| VPS test (crack incidence/10) | 0 | 0 | 0 | 0 |
| Gel time (min, sec) | 3'12" | 3'22" | 3'38" | 3'28" |
| Curing behavior | | | | |
| Torque start tsx (min, sec) | 0'09" | 0'12" | 0'20" | 0'15" |
| 10% curing t'c(10) (min, sec) | 0'18" | 0'20" | 0'31" | 0'24" |
| 90% curing t'c(90) (min, sec) | 2'05" | 2'09" | 2'54" | 2'34" |

| Comp Example | 6 | 7 | 8 | 9 |
|---|---|---|---|---|
| Proportion (wt parts) | | | | |
| Main ingredient | | | | |
| EOCN 102S | 193 | ← | ← | ← |
| Curing agents | | | | |
| BRG #558 | 104 | — | — | — |
| Milex XLC-4L | — | 169 | — | — |
| DPR #5000 | — | — | 180 | — |
| αNX-3.2 | — | — | — | 218 |
| Accelerating agents | | | | |
| PZO (mol) | — | — | — | — |
| C11Z (mol) | 0.008 | ← | ← | ← |
| TPP (mol) | — | — | — | — |
| Physical properties | | | | |
| Glass-transition temperature (° C.) | 175 | 145 | 144 | 153 |
| Flexural strength (Kgf/mm$^2$) | 14.1 | 13.5 | 13.5 | 13.5 |
| Bend elastic const. (Kgf/mm$^2$) | 1480 | 1570 | 1510 | 1510 |
| Boiling water absorption (%) | 0.21 | 0.16 | 0.15 | 0.15 |
| VPS test (crack incidence/10) | 2 | 1 | 2 | 1 |
| Gel time (min, sec) | 4'25" | 5'05" | 5'22" | 5'32" |
| Curing behavior | | | | |
| Torque start tsx (min, sec) | 0'23" | 0'24" | 0'27" | 0'25" |
| 10% curing t'c(10) (min, sec) | 0'30" | 0'31" | 0'40" | 0'34" |
| 90% curing t'c(90) (min, sec) | 5'13" | 5'18" | 6'18" | 6'02" |

| Comp. Example | 10 | 11 | 12 | 13 |
|---|---|---|---|---|
| Proportion (wt parts) | | | | |
| Main ingredient | | | | |
| EOCN 102S | 193 | ← | ← | ← |
| Curing agents | | | | |
| BRG #558 | 104 | — | — | — |
| Milex XLC-4L | — | 169 | — | — |
| DPR #5000 | — | — | 180 | — |
| αNX-3.2 | — | — | — | 218 |
| Accelerating agents | | | | |
| PZO (mol) | — | — | — | — |
| C11Z (mol) | — | — | — | — |
| TPP (mol) | 0.008 | ← | ← | ← |
| Physical properties | | | | |
| Glass-transition temperature (° C.) | 175 | 144 | 145 | 155 |
| Flexural strength (Kgf/mm$^2$) | 13.9 | 13.5 | 13.5 | 13.5 |
| Bend elastic const. (Kgf/mm$^2$) | 1500 | 1560 | 1500 | 1515 |
| Boiling water absorption (%) | 0.22 | 0.17 | 0.15 | 0.15 |
| VPS test (crack incidence/10) | 2 | 2 | 2 | 1 |
| Gel time (min, sec) | 5'08" | 6'21" | 6'55" | 5'40" |
| Curing behavior | | | | |
| Torque start tsx (min, sec) | 0'18" | 0'19" | 0'35" | 0'23" |
| 10% curing t'c(10) (min, sec) | 0'23" | 0'25" | 0'43" | 0'31" |
| 90% curing t'c(90) (min, sec) | 5'48" | 6'01" | 9'22" | 6'41" |

Curing conditions: 150° C.→185° C./5 min, 185° C./5 min(150 kg/cm$^2$), 185° C./8 hr

Example 10

A molding material for a sealer was prepared as described in Example 1, except that a phenol aralkyl resin type of epoxy resin (an epoxidation product of a phenol aralkyl resin (trade name: Milex XLC-4L, Mitsui Chemical Inc., hydroxy equivalent: 169 g/eq) according to a usual process, epoxy equivalent: 238 g/eq) was used as an epoxy resin; a phenol novolac resin (trade name: BRG#558, Showa Kobunshi, hydroxy equivalent: 104 g/eq) was used as a curing agent; and the amount of PZO was 0.0035 mol.

The material was processed as described in Example 1 for determining physical properties of a cured product and for a crack test for a test semiconductor device. The results are shown in Table 3.

Example 11

A molding material for a sealer was prepared as described in Example 10, except that a phenol aralkyl resin (trade name: Milex XLC-4L, Mitsui Chemical Inc., hydroxy equivalent: 169 g/eq) was used as a curing agent.

The material was processed as described in Example 10 for determining physical properties of a cured product and for a crack test for a test semiconductor device. The results are shown in Table 3.

Example 12

A molding material for a sealer was prepared as described in Example 10, except that a phenol-dicyclopentadiene resin (trade name: DPR#5000, Mitsui Chemical Inc., hydroxy equivalent: 180 g/eq) was used as a curing agent.

The material was processed as described in Example 10 for determining physical properties of a cured product and for a crack test for a test semiconductor device. The results are shown in Table 3.

Example 13

A molding material for a sealer was prepared as described in Example 10, except that a naphthol aralkyl resin (trade name: αNX-3.2, Mitsui Chemical Inc., hydroxy equivalent: 218 g/eq) was used as a curing agent.

The material was processed as described in Example 10 for determining physical properties of a cured product and for a crack test for a test semiconductor device. The results are shown in Table 3.

A gel time for the resin composition before roll kneading was 3'48" at 150° C., which was unchanged after leaving it in the atmosphere at room temperature for 10 days.

Comparative Examples 14 to 21

An attempt was made to prepare molding materials as described in Examples 10 to 13 using undecylimidazole (C11Z) (Comparative Examples 14 to 17) or triphenylphosphine (TPP) (Comparative Examples 18 to 21) as a curing agent, but the compositions exhibited quite poor curing properties. Therefore, molding materials for a sealer were prepared, increasing the amount of the catalyst to 0.008 mol.

The materials were processed as described in Example 10 for determining physical properties of a cured product and for a crack test for a test semiconductor device. A gel time for each composition was determined in the same way. The results are shown in Table 3.

Furthermore, in Comparative Example 21 where a naphthol aralkyl resin and triphenylphosphine were used as a curing agent and a catalyst, respectively, a gel time after leaving for 10 days was determined as described in Example 13, to give a gel time of more than 15 min, which apparently indicates deterioration in curing catalyst activity.

TABLE 3

| Example | 10 | 11 | 12 | 13 |
|---|---|---|---|---|
| Proportion (wt parts) | | | | |
| Main ingredient | | | | |
| Epoxidation products of Milex XLC-4L | 238 | ← | ← | ← |
| Curing agents | | | | |
| BRG #558 | | | | |
| Milex XLC-4L | 104 | — | — | — |
| DPR #5000 | — | 169 | — | — |
| αNX-3.2 | — | — | 180 | — |
|  | — | — | — | 218 |
| Accelerating agents | | | | |
| PZO (mol) | 0.0035 | ← | ← | ← |
| C11Z (mol) | — | — | — | — |
| TPP (mol) | — | — | — | — |
| Physical properties | | | | |
| Glass-transition temperature (° C.) | 157 | 130 | 124 | 137 |
| Flexural strength (Kgf/mm$^2$) | 13.2 | 12.8 | 12.2 | 12.6 |
| Bend elastic const. (Kgf/mm$^2$) | 1510 | 1600 | 1500 | 1520 |
| Boiling water absorption (%) | 0.15 | 0.14 | 0.12 | 0.13 |
| VPS test (crack incidence/10) | 0 | 0 | 0 | 0 |
| Gel time (min, sec) | 3'12" | 3'22" | 3'38" | 3'48" |
| Curing behavior | | | | |
| Torque start tsx (min, sec) | 0'10" | 0'11" | 0'22" | 0'17" |
| 10% curing t'c(10) (min, sec) | 0'20" | 0'21" | 0'29" | 0'25" |
| 90% curing t'c(90) (min, sec) | 2'12" | 2'14" | 2'58" | 2'45" |

| Comp. Example | 14 | 15 | 16 | 17 |
|---|---|---|---|---|
| Proportion (wt parts) | | | | |
| Main ingredient | | | | |
| Epoxidation products of Milex XLC-4L | 238 | ← | ← | ← |
| Curing agents | | | | |
| BRG #558 | | | | |
| Milex XLC-4L | 104 | — | — | — |
| DPR #5000 | — | 169 | — | — |
| αNX-3.2 | — | — | 180 | — |
|  | — | — | — | 218 |
| Accelerating agents | | | | |
| PZO (mol) | — | — | — | — |
| C11Z (mol) | 0.008 | ← | ← | ← |
| TPP (mol) | — | — | — | — |
| Physical properties | | | | |
| Glass-transition temperature (° C.) | 154 | 127 | 121 | 131 |
| Flexural strength (Kgf/mm$^2$) | 12.9 | 12.3 | 12.1 | 12.5 |
| Bend elastic const. (Kgf/mm$^2$) | 1450 | 1490 | 1360 | 1370 |
| Boiling water absorption (%) | 0.20 | 0.16 | 0.14 | 0.15 |
| VPS test (crack incidence/10) | 2 | 1 | 1 | 1 |
| Gel time (min, sec) | 5'09" | 5'22" | 5'59" | 7'45" |
| Curing behavior | | | | |
| Torque start tsx (min, sec) | 0'24" | 0'25" | 0'28" | 0'25" |
| 10% curing t'c(10) (min, sec) | 0'33" | 0'36" | 0'45" | 0'40" |
| 90% curing t'c(90) (min, sec) | 5'22" | 5'18" | 6'32" | 6'21" |

| Comp. Example | 18 | 19 | 20 | 21 |
|---|---|---|---|---|
| Proportion (wt parts) | | | | |
| Main ingredient | | | | |
| Epoxidation products of Milex XLC-4L | 238 | ← | ← | ← |
| Curing agents | | | | |
| BRG #558 | | | | |
| Milex XLC-4L | 104 | — | — | — |
| DPR #5000 | — | 169 | — | — |
| αNX-3.2 | — | — | 180 | — |
|  | — | — | — | 218 |
| Accelerating agents | | | | |
| PZO (mol) | — | — | — | — |
| C11Z (mol) | — | — | — | — |
| TPP (mol) | 0.008 | ← | ← | ← |
| Physical properties | | | | |
| Glass-transition temperature (° C.) | 155 | 129 | 123 | 134 |
| Flexural strength (Kgf/mm$^2$) | 12.8 | 12.6 | 12.1 | 12.5 |
| Bend elastic const. (Kgf/mm$^2$) | 1380 | 1460 | 1350 | 1360 |
| Boiling water absorption (%) | 0.20 | 0.18 | 0.14 | 0.15 |
| VPS test (crack incidence/10) | 2 | 2 | 1 | 2 |
| Gel time (min, sec) | 5'59" | 6'12" | 6'55" | 8'21" |
| Curing behavior | | | | |
| Torque start tsx (min, sec) | 0'20" | 0'21" | 0'33" | 0'25" |
| 10% curing t'c(10) (min, sec) | 0'29" | 0'30" | 0'51" | 0'35" |
| 90% curing t'c(90) (min, sec) | 6'09" | 6'21" | 9'53" | 7'12" |

Curing conditions: 150° C.→185° C./5 min, 185° C./5 min(150 kg/cm$^2$), 185° C./8 hr Example 14

A molding material for a sealer was prepared as described in Example 1, except that a phenol-dicyclopentadiene resin type of epoxy resin (trade name: Epicron HP-7200, Dainihon Ink Chem., epoxy equivalent: 262 g/eq) was used as an epoxy resin; a phenol novolac resin (trade name: BRG#558, Showa Kobunshi, hydroxy equivalent: 104 g/eq) was used as a curing agent; and the amount of PZO was 0.0035 mol.

The material was processed as described in Example 1 for determining physical properties of a cured product and for a crack test for a test semiconductor device. The results are shown in Table 4.

Example 15

A molding material for a sealer was prepared as described in Example 14, except that a phenol aralkyl resin (trade name: Milex XLC-4L, Mitsui Chemical Inc., hydroxy equivalent: 169 g/eq) was used as a curing agent.

The material was processed as described in Example 14 for determining physical properties of a cured product and for a crack test for a test semiconductor device. The results are shown in Table 4.

Example 16

A molding material for a sealer was prepared as described in Example 14, except that a phenol-dicyclopentadiene resin (trade name: DPR#5000, Mitsui Chemical Inc., hydroxy equivalent: 180 g/eq) was used as a curing agent.

The material was processed as described in Example 14 for determining physical properties of a cured product and for a crack test for a test semiconductor device. The results are shown in Table 4.

Example 17

A molding material for a sealer was prepared as described in Example 14, except that a naphthol aralkyl resin (trade name: αNX-3.2, Mitsui Chemical Inc., hydroxy equivalent: 218 g/eq) was used as a curing agent.

The material was processed as described in Example 14 for determining physical properties of a cured product and for a crack test for a test semiconductor device. The results are shown in Table 4.

A gel time for the resin composition before roll kneading was 3'37" at 150° C., which was unchanged after leaving it in the atmosphere at room temperature for 10 days.

Comparative Examples 22 to 29

An attempt was made to prepare molding materials as described in Examples 14 to 17 using undecylimidazole (C11Z) (Comparative Examples 22 to 25) or triphenylphosphine (TPP) (Comparative Examples 26 to 29) as a curing agent, but the compositions exhibited quite poor curing properties. Therefore, molding materials for a sealer were prepared, increasing the amount of the catalyst to 0.008 mol.

The materials were processed as described in the corresponding example for determining physical properties of a cured product and for a crack test for a test semiconductor device. A gel time for each composition was determined in the same way. The results are shown in Table 4.

Furthermore, in Comparative Example 29 where a naphthol aralkyl resin and triphenylphosphine were used as a curing agent and a catalyst, respectively, a gel time after leaving for 10 days was determined as described in Example 17, to give a gel time of more than 15 min, which apparently indicates deterioration in curing catalyst activity.

TABLE 4

| Example | 14 | 15 | 16 | 17 |
|---|---|---|---|---|
| Proportion (wt parts) | | | | |
| Main ingredient | | | | |
| Epicron HP-7200 | 262 | 262 | 262 | 262 |
| Curing agents | | | | |
| BRG #558 | 104 | — | — | — |
| Milex XLC-4L | — | 169 | — | — |
| DPR #5000 | — | — | 180 | — |
| αNX-3.2 | — | — | — | 218 |
| Accelerating agents | | | | |
| PZO (mol) | 0.0035 | ← | ← | ← |
| C11Z (mol) | — | — | — | — |
| TPP (mol) | — | — | — | — |
| Physical properties | | | | |
| Glass-transition temperature (° C.) | 156 | 128 | 125 | 136 |
| Flexural strength (Kgf/mm$^2$) | 13.3 | 13.2 | 13.1 | 13.3 |
| Bend elastic const. (Kgf/mm$^2$) | 1490 | 1580 | 1490 | 1500 |
| Boiling water absorption (%) | 0.16 | 0.13 | 0.10 | 0.11 |
| VPS test (crack incidence/10) | 0 | 0 | 0 | 0 |
| Gel time (min, sec) | 3'32" | 3'24" | 3'33" | 3'37" |
| Curing behavior | | | | |
| Torque start tsx (min, sec) | 0'08" | 0'11" | 0'21" | 0'17" |
| 10% curing t'c(10) (min, sec) | 0'20" | 0'21" | 0'32" | 0'23" |
| 90% curing t'c(90) (min, sec) | 2'14" | 2'10" | 2'49" | 2'40" |
| Comp. Example | 22 | 23 | 24 | 25 |
| Proportion (wt parts) | | | | |
| Main ingredient | | | | |
| Epicron HP-7200 | 262 | 262 | 262 | 262 |
| Curing agents | | | | |
| BRG #558 | 104 | — | — | — |
| Milex XLC-4L | — | 169 | — | — |
| DPR #5000 | — | — | 180 | — |
| αNX-3.2 | — | — | — | 218 |
| Accelerating agents | | | | |
| PZO (mol) | — | — | — | — |
| C11Z (mol) | 0.008 | ← | ← | ← |
| TPP (mol) | — | — | — | — |
| Physical properties | | | | |
| Glass-transition temperature (° C.) | 151 | 125 | 122 | 133 |
| Flexural strength (Kgf/mm$^2$) | 12.9 | 12.8 | 12.8 | 12.9 |
| Bend elastic const. (Kgf/mm$^2$) | 1410 | 1470 | 1440 | 1450 |
| Boiling water absorption (%) | 0.20 | 0.15 | 0.15 | 0.16 |
| VPS test (crack incidence/10) | 2 | 2 | 1 | 2 |
| Gel time (min, sec) | 4'52" | 5'19" | 5'28" | 5'42" |
| Curing behavior | | | | |
| Torque start tsx (min, sec) | 0'22" | 0'25" | 0'25" | 0'23" |
| 10% curing t'c(10) (min, sec) | 0'33" | 0'34" | 0'43" | 0'41" |
| 90% curing t'c(90) (min, sec) | 5'25" | 5'31" | 6'31" | 6'28" |

Curing conditions: 150° C.→185° C./5 min, 185° C./5 min(150 kg/cm$^2$), 185° C./8 hr

Example 18

A molding material for a sealer was prepared as described in Example 1, except that an epoxidation product of 1,6-dihydroxynaphthalene (trade name: Epicron HP-4032, Dainihon Ink Chem., epoxy equivalent: 150 g/eq) was used as an epoxy compound; and a phenol novolac resin (trade name: BRG#558, Showa Kobunshi, hydroxy equivalent: 104 g/eq) was used as a curing agent.

The material was processed as described in Example 1 for determining physical properties of a cured product and for a crack test for a test semiconductor device. The results are shown in Table 5.

Example 19

A molding material for a sealer was prepared as described in Example 18, except that a phenol aralkyl resin (trade name: Milex XLC-4L, Mitsui Chemical Inc., hydroxy equivalent: 169 g/eq) was used as a curing agent.

The material was processed as described in Example 18 for determining physical properties of a cured product and for a crack test for a test semiconductor device. The results are shown in Table 5.

Example 20

A molding material for a sealer was prepared as described in Example 18, except that a phenol-dicyclopentadiene resin (trade name: DPR#5000, Mitsui Chemical Inc., hydroxy equivalent: 180 g/eq) was used as a curing agent.

The material was processed as described in Example 18 for determining physical properties of a cured product and for a crack test for a test semiconductor device. The results are shown in Table 5.

Example 21

A molding material for a sealer was prepared as described in Example 18, except that a naphthol aralkyl resin (trade name: αNX-3.2, Mitsui Chemical Inc., hydroxy equivalent: 218 g/eq) was used as a curing agent.

The material was processed as described in Example 18 for determining physical properties of a cured product and for a crack test for a test semiconductor device. The results are shown in Table 5.

A gel time for the resin composition before roll kneading was 3'18" at 150° C., which was unchanged after leaving it in the atmosphere at room temperature for 10 days.

Comparative Examples 30 to 37

An attempt was made to prepare molding materials as described in Examples 18 to 21 using undecylimidazole (C11Z) (Comparative Examples 30 to 33) or triphenylphosphine (TPP) (Comparative Examples 34 to 37) as a curing agent, but the compositions exhibited quite poor curing properties. Therefore, molding materials for a sealer were prepared, increasing the amount of the catalyst to 0.008 mol.

The materials were processed as described in the corresponding example for determining physical properties of a cured product and for a crack test for a test semiconductor device. A gel time for each composition was determined in the same way. The results are shown in Table 5.

Furthermore, in Comparative Example 37 where a naphthol aralkyl resin and triphenylphosphine were used as a curing agent and a catalyst, respectively, a gel time after leaving for 10 days was determined as described in Example 21, to give a gel time of more than 15 min, which apparently indicates deterioration in curing catalyst activity.

TABLE 5

| Example | 18 | 19 | 20 | 21 |
|---|---|---|---|---|
| Proportion (wt parts) | | | | |
| Main ingredient | | | | |
| Epicron HP-4032 | 150 | 150 | 150 | 150 |
| Curing agents | | | | |
| BRG #558 | 104 | — | — | — |
| Milex XLC-4L | — | 169 | — | — |
| DPR #5000 | — | — | 180 | — |
| αNX-3.2 | — | — | — | 218 |
| Accelerating agents | | | | |
| PZO (mol) | 0.0035 | ← | ← | ← |
| C11Z (mol) | — | — | — | — |
| TPP (mol) | — | — | — | — |
| Physical properties | | | | |
| Glass-transition temperature(° C.) | 148 | 136 | 131 | 145 |
| Flexural strength (Kgf/mm$^2$) | 13.8 | 13.2 | 13.0 | 13.1 |
| Bend elastic const. (Kgf/mm$^2$) | 1550 | 1610 | 1540 | 1580 |
| Boiling water absorption (%) | 0.15 | 0.14 | 0.10 | 0.11 |
| VPS test (crack incidence/10) | 0 | 0 | 0 | 0 |
| Gel time (min, sec) | 3'16" | 3'31" | 3'35" | 3'18" |
| Curing behavior | | | | |
| Torque start tsx (min, sec) | 0'08" | 0'10" | 0'18" | 0'13" |
| 10% curing t'c(10) (min, sec) | 0'18" | 0'21" | 0'29" | 0'22" |
| 90% curing t'c(90) (min, sec) | 2'11" | 2'10" | 2'51" | 2'32" |
| Comp. Example | 30 | 31 | 32 | 33 |
| Proportion (wt parts) | | | | |
| Main ingredient | | | | |
| Epicron HP-4032 | 150 | 150 | 150 | 150 |
| Curing agents | | | | |
| BRG #558 | 104 | — | — | — |
| Milex XLC-4L | — | 169 | — | — |
| DPR #5000 | — | — | 180 | — |
| αNX-3.2 | — | — | — | 218 |
| Accelerating agents | | | | |
| PZO (mol) | — | — | — | — |
| C11Z (mol) | 0.008 | ← | ← | ← |
| TPP (mol) | — | — | — | — |
| Physical properties | | | | |
| Glass-transition temperature (° C.) | 146 | 135 | 130 | 143 |
| Flexural strength (Kgf/mm$^2$) | 13.7 | 13.0 | 13.2 | 13.1 |
| Bend elastic const. (Kgf/mm$^2$) | 1540 | 1600 | 1510 | 1570 |
| Boiling water absorption (%) | 0.20 | 0.15 | 0.14 | 0.15 |
| VPS test (crack incidence/10) | 2 | 1 | 1 | 1 |
| Gel time (min, sec) | 4'55" | 5'09" | 5'32" | 5'35" |
| Curing behavior | | | | |
| Torque start tsx (min, sec) | 0'25" | 0'29" | 0'29" | 0'28" |
| 10% curing t'c(10) (min, sec) | 0'35" | 0'39" | 0'41" | 0'39" |
| 90% curing t'c(90) (min, sec) | 5'54" | 5'58" | 6'29" | 6'21" |

TABLE 5-continued

| Comp. Example | 34 | 35 | 36 | 37 |
|---|---|---|---|---|
| Proportion (wt parts) | | | | |
| Main ingredient | | | | |
| Epicron HP-4032 | 150 | 150 | 150 | 150 |
| Curing agents | | | | |
| BRG #558 | 104 | — | — | — |
| Milex XLC-4L | — | 169 | — | — |
| DPR #5000 | — | — | 180 | — |
| αNX-3.2 | — | — | — | 218 |
| Accelerating agents | | | | |
| PZO (mol) | — | — | — | — |
| C11Z (mol) | — | — | — | — |
| TPP (mol) | 0.008 | ← | ← | ← |
| Physical properties | | | | |
| Glass-transition temperature(° C.) | 147 | 134 | 131 | 143 |
| Flexural strength (Kgf/mm²) | 12.7 | 11.9 | 12.1 | 12.0 |
| Bend elastic const. (Kgf/mm²) | 1515 | 1565 | 1490 | 1560 |
| Boiling water absorption (%) | 0.22 | 0.16 | 0.15 | 0.16 |
| VPS test (crack incidence/10) | 2 | 1 | 1 | 1 |
| Gel time (min, sec) | 5'45" | 6'29" | 6'59" | 6'09" |
| Curing behavior | | | | |
| Torque start tsx (min, sec) | 0'29" | 0'26" | 0'38" | 0'30" |
| 10% curing t'c(10) (min, sec) | 0'41" | 0'51" | 0'59" | 0'52" |
| 90% curing t'c(90) (min, sec) | 6'09" | 6'45" | 9'45" | 7'11" |

Curing conditions 150° C.→185° C./5 min, 185° C./5 min (150 kg/cm²), 185° C./8 hr

Example 22

A molding material for a sealer was prepared as described in Example 1, except that a tetramethylbiphenyl type of epoxy resin (trade name: YX4000, epoxy equivalent: 184 g/eq) was used as an epoxy resin; and a phenol novolac resin (trade name: BRG#558, Showa Kobunshi, hydroxy equivalent: 104 g/eq) was used as a curing agent.

The material was processed as described in Example 1 for determining physical properties of a cured product and for a crack test for a test semiconductor device. The results are shown in Table 6.

Example 23

A molding material for a sealer was prepared as described in Example 22, except that a phenol aralkyl resin (trade name: Milex XLC-4L, Mitsui Chemical Inc., hydroxy equivalent: 168 g/eq) was used as a curing agent.

The material was processed as described in Example 22 for determining physical properties of a cured product and for a crack test for a test semiconductor device. The results are shown in Table 6.

Example 24

A molding material for a sealer was prepared as described in Example 22, except that a phenol-dicyclopentadiene resin (trade name: DPR#5000, Mitsui Chemical Inc., hydroxy equivalent: 178 g/eq) was used as a curing agent.

The material was processed as described in Example 22 for determining physical properties of a cured product and for a crack test for a test semiconductor device. The results are shown in Table 6.

Example 25

A molding material for a sealer was prepared as described in Example 22, except that a naphthol aralkyl resin (trade name: αNX-3.2, Mitsui Chemical Inc., hydroxy equivalent: 213 g/eq) was used as a curing agent.

The material was processed as described in Example 22 for determining physical properties of a cured product and for a crack test for a test semiconductor device. The results are shown in Table 6.

A gel time for the resin was unchanged after leaving it in the atmosphere at room temperature for 10 days.

Comparative Examples 38 to 45

Molding materials for a sealer were prepared as described in Examples 22 to 25, except that triphenylphosphine (TPP) (Comparative Examples 38 to 41) or 2-methylimidazole (Shikoku Fine Chemical; 2MZ) (Comparative Examples 42 to 45) was used as a curing agent.

The materials were processed as described in the corresponding example for determining physical properties of a cured product and for a crack test for a test semiconductor device. The results are shown in Table 6.

A gel time for the composition in Comparative Example 41 was determined as described in Example 25. It was more than 15 min, apparently indicating deterioration in curing catalyst activity.

TABLE 6

| Example | 22 | 23 | 24 | 25 |
|---|---|---|---|---|
| Proportion(wt parts) | | | | |
| Main ingredient | | | | |
| YX4000H | 184 | ← | ← | ← |
| Curing agents | | | | |
| BRG #558 | 104 | — | — | — |
| Milex XLC-4L | — | 168 | — | — |
| DPR #5000 | — | — | 178 | — |
| αNX-3.2 | — | — | — | 213 |
| Accelerating agents | | | | |
| PZO (mol) | 0.004 | ← | ← | ← |
| TPP (mol) | — | — | — | — |
| 2MZ (mol) | — | — | — | — |
| Physical properties | | | | |
| Glass-transition temperature (° C.) | 144 | 125 | 123 | 138 |
| Flexural strength (Kgf/mm²) | 12.2 | 12.4 | 12.4 | 12.6 |
| Bend elastic const. (Kgf/mm²) | 1650 | 1640 | 1620 | 1610 |
| Boiling water absorption (%) | 0.08 | 0.09 | 0.10 | 0.12 |
| VPS test (crack incidence/10) | 0 | 0 | 0 | 0 |
| Gel time (min, sec) | 5'23" | 5'18" | 5'35" | 5'11" |
| Curing behavior | | | | |
| Torque start tsx (min, sec) | 1'07" | 1'10" | 1'15" | 1'12" |
| 10% curing t'c(10) (min, sec) | 1'25" | 1'23" | 1'49" | 1'32" |
| 90% curing t'c(90) (min, sec) | 2'41" | 2'38" | 3'11" | 2'52" |

TABLE 6-continued

| Comp. Example | 38 | 39 | 40 | 41 |
|---|---|---|---|---|
| Proportion (wt parts) | | | | |
| Main ingredient | | | | |
| YX4000H | 184 | ← | ← | ← |
| Curing agents | | | | |
| BRG #558 | 104 | — | — | — |
| Milex XLC-4L | — | 168 | — | — |
| DPR #5000 | — | — | 178 | — |
| αNX-3.2 | — | — | — | 213 |
| Accelerating agents | | | | |
| PZO (mol) | — | — | — | — |
| TPP (mol) | 0.015 | ← | ← | ← |
| 2MZ (mol) | — | — | — | — |
| Physical properties | | | | |
| Glass-transition temperature (° C.) | 122 | 192 | 106 | 115 |
| Flexural strength (Kgf/mm$^2$) | 12.8 | 12.8 | 12.2 | 12.4 |
| Bend elastic const. (Kgf/mm$^2$) | 1560 | 1540 | 1550 | 1540 |
| Boiling water absorption (%) | 0.08 | 0.09 | 0.10 | 0.10 |
| VPS test (crack incidence/10) | 2 | 1 | 1 | 1 |
| Gel time (min, sec) | 4'28" | 4'39" | 4'23" | 4'28" |
| Curing behavior | | | | |
| Torque start tsx (min, sec) | 0'25" | 0'29" | 0'29" | 0'28" |
| 10% curing t'c(10) (min, sec) | 0'35" | 0'39" | 0'41" | 0'39" |
| 90% curing t'c(90) (min, sec) | 6'54" | 6'58" | 9'29" | 7'21" |

| Comp. Example | 42 | 43 | 44 | 45 |
|---|---|---|---|---|
| Proportion (wt parts) | | | | |
| Main ingredient | | | | |
| YX4000H | 184 | ← | ← | ← |
| Curing agents | | | | |
| BRG #558 | 104 | — | — | — |
| Milex XLC-4L | — | 167 | — | — |
| DPR #5000 | — | — | 178 | — |
| αNX-3.2 | — | — | — | 213 |
| Accelerating agents | | | | |
| PZO (mol) | — | — | — | — |
| TPP (mol) | — | — | — | — |
| 2MZ (mol) | 0.015 | ← | ← | ← |
| Physical properties | | | | |
| Glass-transition temperature (° C.) | 123 | 104 | 107 | 116 |
| Flexural strength (Kgf/mm$^2$) | 12.4 | 12.6 | 12.3 | 12.4 |
| Bend elastic const. (Kgf/mm$^2$) | 1520 | 1510 | 1550 | 1530 |
| Boiling water absorption (%) | 0.13 | 0.12 | 0.10 | 0.09 |
| VPS test (crack incidence/10) | 2 | 1 | 1 | 1 |
| Gel time (min, sec) | 4'42" | 4'41" | 4'37" | 4'45" |
| Curing behavior | | | | |
| Torque start tsx (min, sec) | 0'29" | 0'26" | 0'38" | 0'30" |
| 10% curing t'c(10) (min, sec) | 0'41" | 0'51" | 0'59" | 0'52" |
| 90% curing t'c(30) (min, sec) | 6'09" | 6'45" | 9'45" | 7'11" |

Curing conditions 150° C.→185° C./5 min, 185° C./5 min (150 kg/cm$^2$), 185° C./8 hr As described with reference to examples in detail, an epoxy-resin composition of this invention comprising a phosphine oxide as an essential accelerating agent in a very small amount can exhibit curing performance equivalent to that from a corresponding composition comprising a conventional catalyst, triphenylphosphine. Its curing behavior is characterized in a reduced time for complete curing, which is significantly advantageous in terms of industrial workability. In addition, it has been found that since having good physical properties such as heat resistance and flexibility, the composition of this invention has excellent crack resistance while having hygroscopicity comparable to a conventional composition.

Furthermore, when using a naphthol type of curing agent, triphenylphosphine gradually loses its catalyst activity due to oxidation, while a phosphine oxide used in this invention is not subject to oxidation and thus can exhibit good storage stability, which is very advantageous for an industrial application.

What is claimed is:

1. An epoxy-resin composition comprising (A) an at least bifunctional epoxy compound and/or an at least bifunctional epoxy resin, (B) a curing agent, and (C) an accelerating agent, the accelerating agent essentially containing a phosphine oxide represented by general formula (1);

where $R_1$ to $R_6$ all of which may be the same or not are hydrogen, straight, branched or cyclic alkyl having 1 to 10 carbons or aryl or aralkyl having 6 to 10 carbons.

2. An epoxy-resin composition as claimed in claim 1 where (B) the curing agent is an at least bifunctional phenol compound and/or an at least bifunctional phenol resin.

3. An epoxy-resin composition as claimed in claim 2 where the at least bifunctional epoxy compound and/or the at least bifunctional epoxy resin is selected from an epoxy resin derived from a dihydroxynaphthalene represented by general formula (2), an epoxy resin derived from a biphenol represented by general formula (3), an epoxy resin derived from a novolac type of resin represented by general formula (4), an epoxy resin derived from a phenol aralkyl resin represented by general formula (5) and an epoxy resin derived from a phenol-dicyclopentadiene resin represented by general formula (6);

where the ring is substituted with 2,3-epoxypropyl groups at 1, 5-, 1,6-, 1,7-, 2,6- or 2,7-positions

(3)

(4)

(5)

(6)

where $R_7$ all of which may be the same or not is hydrogen or methyl; $R_8$ is hydrogen, methyl or ethyl; $R_9$ is halogen, hydroxyl, straight, branched or cyclic alkyl having 1 to 10 carbons, alkoxy having 1 to 10 carbons or phenyl; m is an integer of 0 to 3; and n is an integer of 0 to 100, provided that an average of n is 0 to 15.

4. An epoxy-resin composition as claimed in claim 3 where the at least bifunctional phenol compound and/or an at least bifunctional phenol resin is selected from a novolac type of resin represented by general formula (7), a phenol aralkyl resin represented by general formula (8), a phenol-dicyclopentadiene resin represented by general formula (9) or a naphthol aralkyl resin represented by general formula (10);

(7)

(8)

-continued (9)

(10)

where $R_8$ is hydrogen, methyl or ethyl; $R_9$ is halogen, hydroxy, straight, branched or cyclic alkyl having 1 to 10 carbons, alkoxy having 1 to 10 carbons or phenyl; m is an integer of 0 to 3; n indicating a repeating unit number is an integer of 0 to 100 whose average is 0 to 15; and p indicating a repeating unit number is an integer of 0 to 100 whose average is 0 to 50.

5. An epoxy-resin composition as claimed in claim 4 comprising (D) an organic and/or inorganic filler in the range of 100 to 1900 parts by weight per 100 parts by weight of (A)+(B).

6. An epoxy-resin cured product prepared by heat curing of the epoxy-resin composition as claimed in claim 5.

7. A semiconductor device manufactured by sealing a semiconductor integrated circuit using the epoxy-resin composition as claimed in claim 5.

8. An epoxy-resin composition as claimed in claim 2 where at least the bifunctional phenol compound and/or an at least bifunctional phenol resin is selected from a novolac type of resin represented by general formula (7), a phenol aralkyl resin represented by general formula (8), a phenol-dicyclopentadiene resin represented by general formula (9) or a naphthol aralkyl resin represented by general formula (10);

(7)

(8)

(9)

(10)

where $R_8$ is hydrogen, methyl or ethyl; $R_9$ is halogen, hydroxy, straight, branched or cyclic alkyl having 1 to 10 carbons, alkoxy having 1 to 10 carbons or phenyl; m is an integer of 0 to 3; n indicating a repeating unit number is an integer of 0 to 100 whose average is 0 to 15; and p indicating a repeating unit number is an integer of 0 to 100 whose average is 0 to 50.

9. An epoxy-resin composition as claimed in claim 8 comprising (D) an organic and/or inorganic filler in the range of 100 to 1900 parts by weight per 100 parts by weight of (A)+(B).

10. An epoxy-resin cured product prepared by heat curing of the epoxy-resin composition as claimed in claim 9.

11. A semiconductor device manufactured by sealing a semiconductor integrated circuit using the epoxy-resin composition as claimed in claim 9.

12. An epoxy-resin composition as claimed in claim 3 comprising (D) an organic and/or inorganic filler in the range of 100 to 1900 parts by weight per 100 parts by weight of (A)+(B).

13. An epoxy-resin cured product prepared by heat curing of the epoxy-resin composition as claimed in claim 12.

14. A semiconductor device manufactured by sealing a semiconductor integrated circuit using the epoxy-resin composition as claimed in claim 12.

15. An epoxy-resin composition as claimed in claim 2 comprising (D) an organic and/or inorganic filler in the range of 100 to 1900 parts by weight per 100 parts by weight of (A)+(B).

16. An epoxy-resin cured product prepared by heat curing of the epoxy-resin composition as claimed in claim 15.

17. A semiconductor device manufactured by sealing a semiconductor integrated circuit using the epoxy-resin composition as claimed in claim 15.

* * * * *